Nov. 28, 1950 G. J. ROVNAK 2,531,648

COMBINED REMOTE CONTROL AND EXTENSION FOR TELEPHONES

Filed Feb. 20, 1947

INVENTOR.
George J. Rovnak.
BY W. B. Harpman
ATTORNEY.

Patented Nov. 28, 1950

2,531,648

UNITED STATES PATENT OFFICE 2,531,648

COMBINED REMOTE CONTROL AND EXTENSION FOR TELEPHONES

George J. Rovnak, Campbell, Ohio

Application February 20, 1947, Serial No. 729,709

2 Claims. (Cl. 179—146)

This invention relates to telephones and more particularly to means for remotely actuating a telephone instrument.

The principal object of the invention is the provision of remote control means for a telephone instrument.

A further object of the invention is the provision of a combined extension and remote control means for a telephone.

A still further object of the invention is the provision of a telephone extension and associated controlling devices making possible the use of the extension by the remote control of a telephone instrument to which it is attached.

The remote control and extension for telephones shown and described herein has been designed to form a more practical means of extending telephone service to various points within a building such as a dwelling house wherein the principal telephone instrument is located. It is well known that the current practice of installing telephone extensions is to add a complete telephone instrument to the particular installation which necessitates the duplicating of telephone instruments with each extension installed. In many instances the extensions are used for answering incoming calls only and in these instances the present invention enables the principal telephone instrument to be used, thereby making it unnecessary to supply complete duplicate telephone facilities.

This application is a continuation in part of my co-pending patent application on Telephone Holder and Receiver Lifter, filed November 5, 1945, Ser. No. 626,780, now patent No. 2,490,709 granted December 6, 1949.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein.

Figures 1, 2, 3:
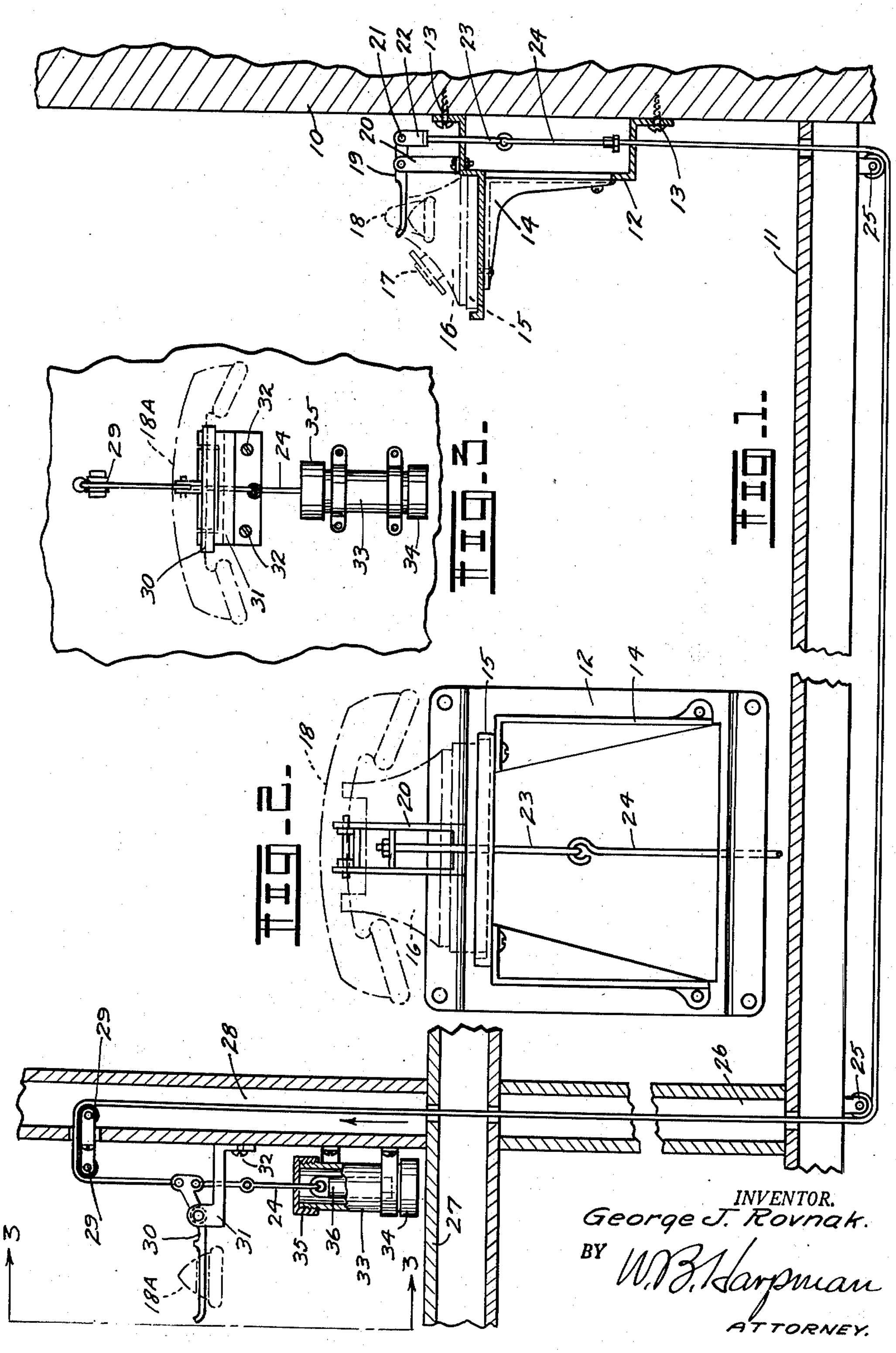
Figure 1 is an expanded elevation of a portion of a building showing the principal telephone instrument and receiver and mechanical remote control means in connection therewith.
Figure 2 is a front elevation of the principal telephone instrument and actuating mechanism.
Figure 3 is a front elevation of the remote control means.

By referring to the drawings and Figure 1 in particular it will be seen that a wall of a building or of a dwelling house is indicated by the numeral 10 and a floor therein is indicated by the numeral 11. The wall 10 has a bracket 12 positioned thereon by means of screws 13. The bracket 12 includes L-shaped bracing members 14 and forms a shelf 15 on which a telephone instrument, indicated by dotted lines and by the numeral 16, may be positioned. The telephone 16 includes the usual dial mechanism 17 and the transmitter receiver unit 18.

Means for remotely actuating the transmitter receiver unit 18 is provided and comprises a lever arm 19 pivoted between upstanding arms of a secondary bracket 20 which in turn is positioned on the bracket 12. The lever arm 19 is also pivoted as by means of a pivot 21 to an adjustable bracket 22 which is affixed on the uppermost end of a rod 23 which in turn is connected with a flexible cable 24. The rod 23 and the cable 24 pass through vertically aligned openings in the bracket 12 and provide means by which movement may be imparted to the lever arm 19 so that the transmitter receiver unit 18 of the telephone may be actuated thereby.

As disclosed in Figure 1 of the drawings, as an example of the manner in which the remote control device may be operated, the flexible cable 24 is passed through an opening in the floor 11 and trained over a plurality of pulleys 25. It then passes upwardly through a hollow partition 26 and through a second floor of a building, indicated by the numeral 27, and upwardly through a hollow partition 28 thereon. It is then passed outwardly through an opening in the hollow partition 28 by means of a pair of appropriately positioned pulleys 29 and connected with a transmitter receiver holder 30 which is pivoted to a bracket 31 which in turn is affixed to the partition 28 by means of screws 32.

An extension transmitter receiver unit 18A is shown in broken lines positioned on the transmitter receiver holder 30 and is wired back to the principal telephone instrument 16 heretofore described. Positioned immediately below the bracket 31 and attached to the hollow partition 28 there is a cylindrical member 33 having a cap 34 on its lowermost end and a cap 35 on its uppermost end. The cap 35 is provided with a central orifice through which a section of the flexible cable 24 may pass. A weight 36 is affixed to the flexible cable and disposed within the cylindrical container 33 and the weight 36 is sufficiently heavy to overbalance the transmitter receiver unit 18 on the principal telephone instrument 16 heretofore referred to.

As illustrated in Figures 1, 2 and 3 of the drawings the transmitter receiver unit 18 on the principal telephone instrument 16 is in normal engagement therewith holding the switches thereof in open position so that the telephone instrument 16 is capable of receiving incoming calls. In order that the telephone may be answered as from a remote location as shown in Figure 1 of the drawings, it is only necessary to lift the extension transmitter receiver unit 18A from the transmitter receiver holder 30 as the weight 36 will then move downwardly in the cylindrical chamber 33 and the motion thereof imparted to the flexible cable 24 will cause the foremost end of the lever arm 19 to rise and hence lift the transmitter receiver unit 18 from the principal telephone instrument 16 thereby closing the switching mechanism incorporated therein. When the extension transmitter receiver 18A is replaced on the holder 30 its weight, added to that of the transmitter receiver 18, will cause the weight 36 to rise in the cylindrical container 33 and hence permit the lever arm 19 to move downwardly and release the transmitter receiver unit 18 on the principal telephone instrument 16.

It will thus be seen that by practicing the invention disclosed herein the remote answering of a telephone instrument is made possible through a simple mechanical expedient of the remote control cable and its operating devices which are automatically actuated by a single extra transmitter receiver unit 18A wired to the principal telephone instrument 16 thus making its unnecessary to duplicate the telephone instrument facilities in order to secure the extension advantages.

Having thus described my invention, what I claim is:

1. The combination of a telephone instrument having two transmitter-receivers electrically connected therewith, one of which is normally positioned on the said telephone instrument and the other of which is located remotely with respect thereto, and means for controlling the said telephone instrument from the said remotely located transmitter-receiver, said means comprising a support for the said telephone instrument, a lever pivotally affixed between its ends to said support and having one end engageable beneath the transmitter-receiver on the said telephone instrument, a flexible cable attached to other and of the said lever arm and extending to the remotely located transmitter-receiver, a pivoted holder affixed to a support and to the said flexible cable and adapted to normally hold the said remotely situated transmitter-receiver, and a weight affixed to said flexible cable and normally urging the said pivoted holder upwardly so as to move the said flexible cable and lift the first mentioned transmitter-receiver from the said telephone instrument, the said pivoted holder normally held inoperative by the said remotely situated transmitter-receiver.

2. The combination of a telephone instrument having a pair of transmitter-receivers electrically connected therewith, one of which is normally positioned on the said telephone instrument and the other of which is located remotely with respect thereto, and means for controlling the said telephone instrument from the said remotely located transmitter-receiver, said means comprising a support for the said telephone instrument, a lever pivotally affixed between its ends on said support and spaced with respect thereto and having one end engageable beneath the transmitter-receiver on the said telephone instrument, a flexible cable attached to the other and of the said lever arm and extending to the remotely located transmitter-receiver, a bifurcated holder for normally supporting the said remotely located transmitter-receiver, said bifurcated holder pivotally affixed to a support and to the said flexible cable, a weight affixed to the said bifurcated holder and normally balancing the said bifurcated holder in position supporting the said remotely located transmitter-receiver, said weight capable of moving said cable at such time as the said remotely situated transmitter-receiver is removed from the said bifurcated holder whereby the said lever arm is moved to lift the first mentioned transmitter-receiver from the said telephone instrument.

GEORGE J. ROVNAK.

REFERENCES CITED

The following references are of record in the file of this patent:

UNITED STATES PATENTS

| Number | Name | Date |
|---|---|---|
| 268,062 | Westgate | Nov. 28, 1882 |
| 1,470,296 | Stedman | Oct. 9, 1925 |
| 2,020,527 | Swaine | Nov. 12, 1935 |
| 2,071,053 | Varley | Feb. 16, 1937 |

FOREIGN PATENTS

| Number | Country | Date |
|---|---|---|
| 409,196 | Germany | Feb. 2, 1925 |